US007279507B2

(12) United States Patent
Hu et al.

(10) Patent No.: US 7,279,507 B2
(45) Date of Patent: Oct. 9, 2007

(54) CONTACT LENSES

(75) Inventors: Hopin Hu, Albuquerque, NM (US); Charles R. Briggs, Albuquerque, NM (US); Tung Nguyen, Albuquerque, NM (US); Hue Tran, Albuquerque, NM (US); Filene Rossberg, Albuquerque, NM (US)

(73) Assignee: CooperVision International Holding Company, LP, St. Michael (BB)

( * ) Notice: Subject to any disclaimer, the term of this patent is extended or adjusted under 35 U.S.C. 154(b) by 190 days.

(21) Appl. No.: 10/937,868

(22) Filed: Aug. 2, 2004

(65) Prior Publication Data

US 2005/0148682 A1 Jul. 7, 2005

Related U.S. Application Data

(63) Continuation of application No. 09/757,274, filed on Jan. 8, 2001, now abandoned, which is a continuation of application No. PCT/US99/15532, filed on Jul. 8, 1999.

(60) Provisional application No. 60/092,100, filed on Jul. 8, 1998.

(51) Int. Cl.
*G02C 7/04* (2006.01)
(52) U.S. Cl. .................... 523/108; 523/106; 523/107; 351/160 H
(58) Field of Classification Search ........ 523/106–108; 351/160 H
See application file for complete search history.

(56) References Cited

U.S. PATENT DOCUMENTS

| | | | |
|---|---|---|---|
| 3,647,736 A | 3/1972 | Ewell | |
| 3,721,657 A | 3/1973 | Seiderman | |
| 3,839,304 A | 10/1974 | Hovey | |
| 3,876,581 A | 4/1975 | Neogi | |
| 3,966,847 A | 6/1976 | Seiderman | |
| RE29,231 E | 5/1977 | Leeds | |
| 4,038,264 A * | 7/1977 | Rostoker et al. | 526/286 |
| 4,042,552 A * | 8/1977 | Grucza | 523/108 |
| 4,054,624 A * | 10/1977 | Le Boeuf et al. | 264/2.6 |
| 4,073,577 A | 2/1978 | Hofer | |
| 4,158,030 A | 6/1979 | Stoyan | |
| 4,536,554 A | 8/1985 | Lim et al. | |
| 4,575,539 A | 3/1986 | DeCrosta et al. | |
| 4,699,934 A | 10/1987 | Ohkado et al. | |
| 4,771,089 A | 9/1988 | Ofstead | |
| 4,859,719 A | 8/1989 | Ofstead | |
| 4,931,228 A | 6/1990 | Keeley | |
| 5,087,392 A | 2/1992 | Burke et al. | |
| 5,210,111 A * | 5/1993 | Goldenberg et al. | 523/108 |
| 5,217,491 A | 6/1993 | Vanderbilt | |
| 5,241,006 A | 8/1993 | Iqbal et al. | |
| 5,270,415 A | 12/1993 | Sulc et al. | |
| 5,310,779 A | 5/1994 | Lai | |
| 5,362,420 A | 11/1994 | Itoh et al. | |
| 5,391,669 A | 2/1995 | Sulc et al. | |
| 5,397,848 A | 3/1995 | Yang et al. | |
| 5,412,016 A | 5/1995 | Sharp | |
| 5,468,811 A | 11/1995 | Moro et al. | |
| 5,482,981 A | 1/1996 | Askari et al. | |
| 5,484,863 A | 1/1996 | Molock et al. | |
| 5,490,960 A | 2/1996 | Nunez et al. | |
| 5,505,884 A | 4/1996 | Burke et al. | |
| 5,519,069 A | 5/1996 | Burke et al. | |
| 5,529,914 A | 6/1996 | Hubbell et al. | |
| 5,598,233 A | 1/1997 | Haralambopoulos et al. | |
| 5,629,360 A | 5/1997 | Askari et al. | |
| 5,644,049 A | 7/1997 | Giusti et al. | |
| 5,656,210 A | 8/1997 | Hill et al. | |

(Continued)

FOREIGN PATENT DOCUMENTS

EP 0 318 604 A1 6/1989

(Continued)

OTHER PUBLICATIONS

Abstract: XP-002200206 & JP 03 079608 A (Shingijutsu Kaihatsu KK), Apr. 4, 1991, Database WPI, Section Ch, Week 199120, Derwent Publications, Ltd., London, GB; AN 1991-143954.

(Continued)

*Primary Examiner*—Peter Szekely
(74) *Attorney, Agent, or Firm*—Kilyk & Bowersox, P.L.L.C.

(57) ABSTRACT

An interpenetrating polymer network (IPN) composition and a process for the manufacture of hydrogel contact lens using the invention material. The polymeric materials are formed by polymerization of: (1) an unsaturated alkyl(meth)acrylate or its derivatives such as 2-hydroxyethyl methacrylate as the principle monomer; (2) optionally vinyl containing comonomer(s) to enhance the resulting hydrogel water absorbing capability; (3) polymerizable multi-functional crosslinking agent(s); (4) an irradiation initiator and/or thermal initiator; (5) optionally other additives to impart the resulting hydrogel specific properties such as ultra-violet blocking ability and handling colors; in the presence of a soluble, hydrophilic IPN agent such as polyvinylpyrrolidone (PVP) or poly-2-ethyl-2-oxazoline (PEOX) with a specific molecular weight range. The novel hydrophilic hydrogel material in the present invention can be used to produce a spherical contact lens, a toric contact lens, a multifocal contact lens, a toric-multifocal contact lens, and other medical devices. The inventive hydrogel material shows a low degree of surface friction, a low dehydration rate, and a high degree of biodeposit resistance.

57 Claims, No Drawings

U.S. PATENT DOCUMENTS

| | | | |
|---|---|---|---|
| 5,674,942 | A | 10/1997 | Hill et al. |
| 5,824,719 | A | 10/1998 | Kunzler et al. |
| 5,852,126 | A | 12/1998 | Barnard et al. |
| 5,888,243 | A | 3/1999 | Silverstrini |
| 5,998,498 | A * | 12/1999 | Vanderlaan et al. ........ 523/107 |
| 6,103,865 | A | 8/2000 | Bae et al. |
| 6,120,904 | A | 9/2000 | Hostettler et al. |
| 6,228,919 | B1 | 5/2001 | Sommerfeld |
| 6,271,278 | B1 | 8/2001 | Park et al. |
| 6,367,929 | B1 * | 4/2002 | Maiden et al. .......... 351/160 H |
| 6,372,815 | B1 | 4/2002 | Sulc et al. |

FOREIGN PATENT DOCUMENTS

| | | |
|---|---|---|
| EP | 0 351 364 A2 | 1/1990 |
| EP | 0 482 835 A1 | 4/1992 |
| FR | 2 772 033 | 6/1999 |
| WO | WO 00/02937 | 1/2000 |

OTHER PUBLICATIONS

Search Report EP 99 93 3826 dated Sep. 24, 2002.

* cited by examiner

CONTACT LENSES

CROSS-REFERENCE TO RELATED APPLICATIONS

This application is a continuation of U.S. application Ser. No. 09/757,274, filed Jan. 8, 2001, now abandoned, which is a continuation of International Application PCT/US99/15532, with an international filing date of Jul. 8, 1999, now complete, which claims the benefit of the filing of U.S. Provisional Patent Application Ser. No. 60/092,100, entitled IPN Hydrophilic Non-Ionic Hydrogels, filed on Jul. 8, 1998, the disclosures of which in their entireties are hereby incorporated by reference.

BACKGROUND OF THE INVENTION

1. Field of the Invention (Technical Field):

The present invention relates to an interpenetrating polymer network (IPN) composition, especially a hydrophilic hydrogel composition for contact lens. More particularly, the present invention relates to polymerization of monomers in the presence of water soluble polymers as the IPN agents miscible with the monomer mixture using conventional crosslinkers or polymeric crosslinkers under ultraviolet and/or thermal curing condition.

2. Background Art:

Interpenetrating polymer network (IPN) technology has been undergoing development over the past several decades. An IPN consists of at least two types of polymers wherein one polymer is synthesized in the presence of an already existing polymer, or both polymers are synthesized simultaneously.

From a chemical point of view, an IPN is a whole unit structure formed from at least two distinct polymers. An IPN thereby has the physical and chemical properties of the constituent polymers, and thus combines the advantages of the polymers.

Hydrophilic hydrogels prepared by an IPN process have gained a great deal of attention in a variety of fields. The following patents disclose IPN hydrogels. U.S. Pat. No. 4,575,539 entitled "Drug delivery systems including novel interpenetrating polymer networks and method," to DeCrosta, et al., issued Mar. 11, 1986, discloses an IPN employing hydrogel beads which is formed by swelling hydrogel beads with an acrylic type swelling agent and reacting the swelling agent with a crosslinking agent such as ethyleneglycol dimethacrylate. The system so produced has superior drug leading capacity and controlled release characteristics. U.S. Pat. No. 5,644,049, entitled "Biomaterial comprising hyaluronic acid and derivatives thereof in interpenetrating polymer networks (IPN)," to Giusti, et al., issued Jul. 1, 1997, discloses the use of hyaluronic acid and its derivatives in IPN to form a hydrogel. The IPN biomaterial so prepared is useful in many applications including dermatology, microsurgery, urology, and cardiovascular systems.

In the contact lens field, hydrogels are often formed by copolymerization of monomers with the appropriate crosslinkers. The following patents disclose hydrogels formed by copolymerization. U.S. Pat. No. 5,665,840, entitled "Polymeric Networks from Water-Soluble Prepolymers," to Pöhlmann et al., issued Sep. 9, 1997, discloses a water-soluble, crosslinkable prepolymer having monomeric structural units of a vinyl lactam, vinyl alcohol, alkanecarboxylic acid vinyl ester, vinylic crosslinking agent, and a vinylic photo initiator. The patent further discloses water-soluble crosslinkable prepolymer having a copolymer chain comprising 5 to 85% by weight of a vinyl lactam, for example, N-vinyl pyrrolidone. A variety of N-vinyl lactams are disclosed according to a structural formula presented within. The most preferred vinyl lactam is N-vinyl-2-pyrrolidone. U.S. Pat. No. 4,430,458, entitled "Hydrogel-Forming Polymeric Materials," to Tighe, et al., issued Feb. 7, 1984, discloses polymeric materials suitable for making contact lenses formed by copolymerization and crosslinking of an amide of an unsaturated carboxylic acid, an N-vinyl lactam, an ester of an unsaturated carboxylic acid, an unsaturated carboxylic acid, and a polymerizable hydrophobic vinyl monomer. This patent claims a contact lens in the form of a hydrogel comprising a crosslinked polymeric material containing units derived either by simultaneous copolymerization and crosslinking or by co-polymerization and subsequent crosslinking of the following monomers: 20 to 40 mole percent of an amide of acrylic of methacrylic acid; 25 to 55 mole percent of an N-vinyl lactam of the N-vinyl pyrrolidone type; 5 to 20 mole percent of an hydroxy alkyl ester of acrylic or methacrylic acid; 1 to 10 mole percent of acrylic or methacrylic acid; and at least about 5 up to about 10 mole percent of a polymerizable hydrophobic vinyl monomer. U.S. Pat. No. 4,022,754, entitled "Novel copolymer having utility as contact lens," to Howes, et al., issued May 10, 1997, discloses a method to prepare terpolymers containing 3-methoxy-2-hydroxy-propyl methacrylate, N-vinylpyrrolidone, and methyl methacrylate, suitable for contact lens.

The use of an IPN hydrogel contact lens material has been found much less common, for instance, consider the following patents. U.S. Pat. No. 4,536,554, entitled "Hydrophilic polymers and contact lenses made therefrom," to Lim, et al., issued Aug. 20, 1985, discloses the preparation of soft contact lenses made from IPN obtained by the polymerization of a mixture containing a hydrophilic vinylpyrrolidone monomer and a hydrophobic acrylic ester monomer in the presence of multiple crosslinking agents. U.S. Pat. No. 5,674,942, entitled "Interpenetrating polymer networks for contact lens production," to Hill, et al., issued Oct. 7, 1997, discloses another IPN method using polyurea interlocked with polyacrylate; the former polymer is prepared from amines and isocyanates while the latter polymer is prepared from acrylic esters using a free radical initiator.

The following patents also disclose hydrogels:

U.S. Pat. No. 4,990,582, entitled "Fluorine-Containing Soft Contact Lens Hydrogels," to Salamone, issued Feb. 5, 1991, discloses a soft contact lens material that exists as a hydrogel and is formed by a polymer containing a fluorinated monomer, a hydroxy alkyl ester of acrylic or methacrylic acid, and an N-vinyl lactam. According to the disclosure, an N-vinyl lactam is present from 5 to 80% by weight. The addition of the N-vinyl lactam is critical in combination with the fluoromonomer and the hydroxy alkyl ester of acrylic or methacrylic acid, to obtain clear bulk copolymers without any haze or opacity. The preferred N-vinyl lactam is N-vinyl pyrrolidone in concentrations from 5 to 80% by weight and preferably from 40 to 60% by weight. In the claims, about 10 to about 50 parts by weight of N-vinyl lactam is present.

U.S. Pat. No. 4,829,126, entitled "High Water-Absorptive Soft Contact Lens," to Nakajima et al., issued May 9, 1989, discloses a highly water-absorptive soft contact lens made of a copolymer comprising 10 to 40 parts by weight of an acrylate or methacrylate polymer and 60 to 90 parts by weight of a hydrophilic monomer. To achieve a balance between structural integrity and water absorption, methacrylate monomers having a hydrophilic group are used, such as the N-vinyl lactam, N-vinyl pyrrolidone.

U.S. Pat. No. 4,620,954, entitled "Hydrogel from Ultraviolet-Initiated Copolymerization," to Singer, et al., issued Nov. 4, 1986, discloses a contact lens hydrogel prepared by copolymerizing 70 parts of N-vinyl pyrrolidone and 23 parts of phenyl ethyl methacrylate, together with allyl methacrylate as a crosslinker, T-butyl peroctoate as a thermal initiator and 2,2-dimethoxy-2-phenylacetophenone or benzoin methyl ether as a photo initiator. The patent discloses N-vinyl pyrrolidone as a preferred N-vinyl lactam monomer and phenylethyl methacrylate as a preferred hydrophobic acrylate.

U.S. Pat. No. 4,440,919, entitled "Low N-Vinyl Lactam Content Based Biomedical Devices," to Chromecek et al., issued Apr. 3, 1984, discloses N-vinyl lactam content copolymers that are crosslinked with resonance-free dye (alkine tertiary amine) cyclic compounds to obtain biomedical devices such as soft contact lenses. This patent also discloses the use of water-soluble diluents for use in the aforementioned polymer system to modify the physical properties of these properties. Such diluents are present, preferably, at not more than 30 weight percent. Diluents include low molecular weight, e.g., 500 to 10,000, linear poly (vinyl pyrrolidone).

U.S. Pat. No. 4,184,992, entitled "Cross-Linked Alkyl Methacrylate-N-Vinyl Lactam Polymer Composition for Use in Soft Contact Lenses," to Hosaka, issued Jan. 22, 1980, discloses a crosslinked polymer composition prepared by polymerizing, using a bulk polymerization procedure, a monomer mixture comprising an alkyl methacrylate and an N-vinyl lactam in the presence of a crosslinking agent such as vinyl acrylate, vinyl methacrylate, triallyl isocyanurate and vinyl carboxylates. This patent discloses 2-hydroxyethyl methacrylate ("HEMA")/N-vinyl pyrrolidone copolymer gels. Such gels are prepared by copolymerizing HEMA with N-vinyl pyrrolidone or graft-copolymerizing HEMA onto poly-N-vinyl pyrrolidone. A main point of this particular patent resides in the crosslinking agent used in combination with the methacrylate/N-vinyl lactam copolymerized mixture.

U.S. Pat. No. 4,045,547, entitled "Fabrication of Soft Contact Lens and Composition Therefor," to Le Bouef et al., issued Aug. 30, 1977, discloses a contact lens composition comprising from 67.2% to 79.3% HEMA; from 14.25% to 35% PVP; from 0.1% to 4.04% EDMA; from 0.1% to 2.5% MA; from 0.1% to 5.0% water; from 0% to 4% PPMHQ inhibitor; and from 50 to 250 PPM MEHQ inhibitor.

SUMMARY OF THE INVENTION

Disclosure of the Invention

The present invention relates to hydrogels comprising an interpenetrating polymer network (IPN). The IPN of the present invention comprise at least one polymer, formed through polymerization of monomer, and at least one interpenetrating polymer network agent. In preferred embodiments of the invention, the IPN agent comprises at least one polymer selected from the group of polymers comprising one or more monomeric units comprising at least one =N—C(=O)— group having an average molecular weight of from approximately 500 to approximately 300,000; polymers with one or more monomeric units comprising at least one N-oxide group having an average molecular weight of from approximately 500 to approximately 300,000; polymers comprising both =N—C(=O)— and N-oxide groups of (A) and (B); and mixtures thereof. To enhance properties of the hydrogels of the present invention, additional materials are optionally added, such as, materials selected from the group consisting of: monomers, polymer crosslinkers, polymerization initiators, ultraviolet absorbing material, colorant, antiseptic agents, and combinations thereof.

The IPN hydrogels of preferred embodiments of the present invention have a water loss of less than approximately 5 weight percent after 5 minutes at approximately 75% humidity and approximately 24° C. Sample experiments demonstrating such water loss characteristics appear under the Example section of this disclosure wherein details of the experimental procedure also appear.

In preferred embodiments of the present invention, the aforementioned at least one polymer, formed through polymerization of monomer, comprises monomer selected from the group consisting of: 2-hydroxyethylmethacrylate, 2-hydroxyethylacrylate, methylmethacrylate; methylacrylamide; methacrylamide; N,N-dimethyl-diacetoneacrylamide; 2-phosphatoethylmethacrylate; di-, tri-, tetra-, penta-, . . . polyethyleneglycol monoacrylate and methacrylate; 4- and 2-methyl-5-vinylpyridine; N-(3-methacrylamidopropyl)-N,N-dimethylamine; N-(3-methacrylamidopropyl)-N,N,N-trimethylamine; 1-vinyl-, and 2-methyl-1-vinlyimidazole; N-(3-acrylamido-3-methylbutyl)-N,N-dimethylamine; N-methylacrylamide; 3-hydroxypropyl methacrylate; N-vinyl imidazole; N-vinyl succinimide; N-vinyl diglycolylimide; N-vinyl glutarimide; N-vinyl-3-morpholinone; N-vinyl-5-methyl-3-morpholinone; propyl methacrylate; propyl acrylate; butyl methacrylate; butyl acrylate; pentyl acrylate; pentyl methacrylate; dimethyl diphenyl methylvinyl siloxane; N-(1,1-dimethyl-3-oxobutyl)acrylamide; 2-ethyl-2-(hydroxy-methyl)-1,3-propanediol trimethacrylate; X-(dimethylvinylsilyl)-ω-[(dimethylvinyl-silyl)oxy]-dimethyl diphenyl methylvinyl siloxane; butyl(meth)acrylate; 2-hydroxybutyl methacrylate; vinyl acetate; pentyl methacrylate; vinyl propionate; 3-hydroxy-2-naphthyl methacrylate; vinyl alcohol; N-(formylmethyl)acrylamide; 2-ethoxyethyl methacrylate; 4-t-butyl-2-hydroxycyclohexyl methacrylate; 2-(methacryloyloxy)ethyl vinyl carbonate; vinyl[3-[3,3,3-trimethyl-1,1-bis(trimethylsiloxy)disiloxany]propyl]carbonate; 4,4'-(tetrapentacontmethylhepta-cosasiloxanylene) di-1-butanol; N-carboxy-β-alanine N-vinyl ester; 2-methacryloyloxyethyl phosphorylcholine, and combinations thereof. Variations of these monomers, well-known in the art of monomer chemistry and physics, are within the scope of the present invention, especially those monomers capable of forming an IPN with the IPN agents of the present invention, in particular, those monomers capable of forming an IPN with IPN agents PVP, PEOX, and PVNO. However, the IPN agents are not limited to PVP, PEOX, and PVNO. In general, IPN agents are polymers with one or more monomeric units comprising at least one =N—C(=O)— group having an average molecular weight of from approximately 500 to approximately 300,000; polymers with one or more monomeric units comprising at least one N-oxide group having an average molecular weight of from approximately 500 to approximately 300,000; polymers comprising both =N—C(=O)— and N-oxide groups; and mixtures thereof. Therefore, for instance, polymers comprising N-vinyl pyrrolidone monomer wherein the pyrrolidone group appears on a less than one to one basis with respect to a polymer backbone subunit, e.g., vinyl, are within the scope of the present invention. The IPN hydrogel compositions of the present invention preferably comprise at least one IPN agent that is present from approximately 1% by dry weight to approximately 14% by dry weight and more preferably from 5% by dry weight to approximately 10% by dry weight. Regarding the average molecular weight of the IPN agent PVP, the preferred weight average molecular weight is greater than 10,000. Again, optional materials selected from the group consisting of monomers, polymer crosslinkers, polymerization initiators, ultraviolet absorbing material, colorant, antiseptic agents, and combinations thereof allow for modification of the general IPN hydrogel to meet specific needs and requirements, particularly for IPN-based contact lenses.

Preferred embodiments of the hydrogel compositions of the present invention also comprise optional monomer such as at least one sulfoxide containing agent selected from the group consisting: sulfoxide containing methacrylates, sulfoxide containing acrylates, and combinations thereof. Although present in all examples presented within, the presence of crosslinker is also optional and comprises at least one member selected from the group consisting of monomer and polymer. For polymer crosslinker comprising a polymer, a molecular weight range from approximately 300 to approximately 1500 is preferred. In preferred embodiments of the present invention, the crosslinker is present from approximately 0.1% by dry weight to approximately 8% by dry weight and preferably from 0.5% by dry weight and approximately 4% by dry weight of the hydrogel. Preferred crosslinkers are polyethylene glycol dimethacrylate and ethylene glycol dimethacrylate, which are useful alone or in combination. For instance, polyethylene glycol dimethacrylate having a molecular weight of approximately 400 is mixable with that having a molecular weight of approximately 1000. Furthermore, material of varying molecular weight is combinable with crosslinker monomer(s).

In preferred embodiments, the hydrogel compositions of the present invention optionally include monomers other than the "principal monomer," such as, but not limited to, at least one monomer selected from the group consisting of methyl methacrylate and N-vinyl lactams. For instance, the list of optional monomer includes the N-vinyl lactam, N-vinylpyrrolidone. The principal monomer is so called to define a particular group of monomers—at least one of which is always present in the inventive hydrogel. Whereas optional monomers, on the other hand, are just that, optional. No limitation is made as to "principal" and weight percentage or parts, thus, IPN agent or optional monomer can exceed the weight percentage or parts of the principal monomer.

Again, a primary object of the present invention, as applied to contact lenses, is water rentention. Preferred embodiments of the present invention use at least one interpenetrating network agent comprising an agent selected from the group consisting of polyvinylpyrrolidone, poly-2-ethyl-2-oxazoline, and poly(4-vinylpyridine N-oxide). In particular, preferred embodiments of the present invention using PVP and/or PEOX have shown water loss of less than 4%. Combinations of PVP, PEOX, and PVNO, are within the scope of the present invention and are theoretically expected to produce results similar to the hydrogels presented in the examples contained within.

A primary object of the present invention is to provide a biocompatible IPN-based hydrogel.

A primary advantage of the present invention is formation of IPN-based hydrogels having superior water retention.

Other objects, advantages and novel features, and further scope of applicability of the present invention will be set forth in part in the detailed description to follow, and in part will become apparent to those skilled in the art upon examination of the following, or may be learned by practice of the invention. The objects and advantages of the invention may be realized and attained by means of the instrumentalities and combinations particularly pointed out in the appended claims.

It is a further primary object of the present invention to provide a hydrophilic hydrogel contact lens prepared by an IPN process, having a good mechanical strength and elongation, and showing a low degree of surface friction, a low dehydration rate, and minimal biodeposition.

It is another object of the present invention to provide a hydrophilic hydrogel contact lens prepared using an unsaturated alkyl (meth)acrylate or its derivatives as the principle monomers, optionally a vinyl containing comonomer(s), crosslinking agents, initiators, and optionally other additivies to impart the resulting contact lens specific properties, in the presence of a soluble, hydrophilic IPN agent during polymerization process for the low, medium, and high water content lenses of all kinds and types of geometric designs including but not being limited to spherical, aspheric, and toric.

It is a further object of the present invention to provide a hydrophilic hydrogel contact lens polymerized by a radiation such as, but not limited to, E-beam, ultraviolet and/or thermal, and microwave.

Objects of the present invention are achieved through formation of hydrophilic hydrogel contact lens using, for instance, monomers such as unsaturated alkyl (meth)acrylate or its derivatives, preferably 2-hydroxyethyl methacrylate (HEMA); optionally a vinyl containing comonomer(s), preferably methacrylic acid (MAA), N-vinylpyrrolidone (NVP), or polyethylene(400) glycol (PEG 400) monomethyl ether monomethacrylate; crosslinking agents, preferably polyethylene glycol dimethacrylate in a molecular weight range from 400 to 1000; initiators, preferably 2,2'-azobisisobutyronitrile (AIBN), 2-hydroxy-2-methyl-1-phnyl-1-propanone (DAROCUR® 1173, E. Merck, Darmstadt, Germany), and 1,1'-azodi(hexahydrobenzonitrile); and optional additives, preferably 2-hydroxy-4-acrylyloxyethoxybenzophenone as a UV blocking agent and copper phthalocyanine blue as a handling colorant; in the presence of an IPN agent, preferably polyvinylpyrrolidone (PVP) or poly-2-ethyl-2-oxazoline (PEOX), wherein polymerization of monomers occurs through E-beam, ultraviolet, and/or thermal curing processes.

DESCRIPTION OF THE PREFERRED EMBODIMENTS

Best Modes for Carrying Out the Invention

The present invention relates to an IPN composition, especially a hydrophilic hydrogel composition for contact lenses. More particularly, the present invention relates to polymerization of a mixture of monomers and a synthesized non-ionic polymer as an IPN agent using a crosslinking agent or a mixture of crosslinking agents. After polymerization, via irradiation such as ultraviolet and/or thermal processing, the produced crosslinked polymer is hydrated to form a hydrogel having a low degree of surface friction, superior water retention, and a high degree of biodeposit resistance.

The present invention also relates to the contact lens preparation including the polymerization process, prehydrated dry lens preparation, and corresponding hydration process.

In accordance with the present invention, the principle monomers which can be used include, but are not limited to:

2-hydroxyethylmethacrylate (HEMA); 2-hydroxyethylacrylate (HEA); methylmethacrylate (MMA); methylacrylamide (MAA); methacrylamide; N,N-dimethyl-diacetoneacrylamide; 2-phosphatoethylmethacrylate; di-, tri-, tetra-, penta-, . . . polyethyleneglycol monoacrylate and methacrylate; 4- and 2-methyl-5-vinylpyridine; N-(3-methacrylamidopropyl)-N,N-dimethylamine; N-(3-methacrylamidopropyl)-N,N,N-trimethylamine; 1-vinyl-, and 2-methyl-1-vinlyimidazole; N-(3-acrylamido-3-methylbutyl)-N,N-dimethylamine; N-methylacrylamide; 3-hydroxypropyl methacrylate; N-vinyl imidazole; N-vinyl succinimide; N-vinyl diglycolylimide; N-vinyl glutarimide; N-vinyl-3-morpholinone; N-vinly-5-methyl-3-morpholinone; propyl methacrylate; propyl acrylate; butyl methacrylate; butyl acrylate; pentyl acrylate; pentyl methacrylate; dimethyl diphenyl methylvinyl siloxane; N-(1,1-dimethyl-3-oxobutyl)acrylamide; 2-ethyl-2-(hydroxy-methyl)-1,3-propanediol trimethacrylate; X-(dimethylvinylsilyl)-ω-[(dimethylvinyl-silyl)oxy]-dimethyl diphenyl methylvinyl siloxane; butyl(meth)acrylate; 2-hydroxybutyl methacrylate; vinyl acetate; pentyl methacrylate; vinyl propionate; 3-hydroxy-2-naphthyl methacrylate; vinyl alcohol; N-(formylmethyl)acrylamide; 2-ethoxyethyl methacrylate; 4-t-butyl-2-hydroxycyclohexyl methacrylate; 2-(methacryloyloxy)ethyl vinyl carbonate; vinyl[3-[3,3,3-trimethyl-1,1-bis(trimethylsiloxy)disiloxany]propyl] carbonate; 4,4'-(tetrapentacontmethylhepta-cosasiloxanylene)di-1-butanol; N-carboxy-β-alanine N-vinyl ester; 2-methacryloyloxyethyl phosphorylcholine and the like.

Among these monomers, 2-hydroxyethylmethacrylate (HEMA) is preferred and the HEMA chemical structure is shown in Structure 1.

2-Hydroxyethylmethacrylate

Structure 1

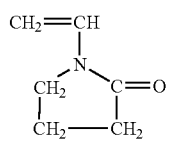

The concentration of the principle monomer is typically in the range of 5% to 95% by weight, and preferably in the range of 20% to 85%, depending upon the desired properties of the resulting hydrogels.

If desired to prepare a hydrogel having a water content greater than 40%, eg., preparation of mid- or high water content contact lens, the use of additional highly hydrophilic comonomer is necessary. The additional highly hydrophilic comonomers useful in the present invention include, but are not limited to, acrylic acid, methacrylic acid, sulfoxide containing (meth)acrylate, N-vinylpyrrolidone, 2-acrylamido-2-methylpropanesulfonic acid and its salts, vinylsulfonic acid and its salts, styrenesulfonic acid and its salts, 3-methacryloyloxy propyl sulfonic acid and its salts, allylsulfonic acid, 2-methacryloyloxyethyltrimethylammonium salts, N,N,N-trimethylammonium salts, diallyl-dimethylammonium salts, polyethylene glycol (400) monomethyl ether monomethacrylate, glycerol monomethacrylate, and the like.

To obtain a greater water content non-ionic hydrogel, the preferred additional comonomers are N-vinylpyrrolidone, sulfoxide containing (meth)acrylate, polyethylene glycol (400) monomethyl ether monomethacrylate, and glycerol monomethacrylate whose chemical structures are illustrated in Structure 2 to 5, respectively.

N-vinylpyrrolidone

Structure 2

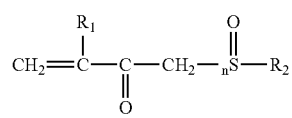

Sulfoxide containing (Meth)acrylate

Structure 3

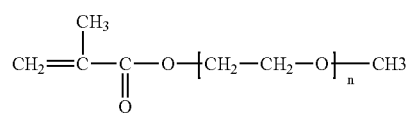

Where n can be 1,2, and 3; $R_1$ can be either H or $CH_3$; and $R_2$ can be either $CH_3$ or $C_2H_5$.

Polyethylene glycol (400) monomethyl ether monomethacrylate

Structure 4

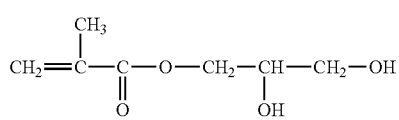

Where n is an integral indicating the number of repeating units for a specific molecular weight. In the case of polyethylene glycol (400) monomethyl ether monomethacrylate, n is 7.

Glycerol monomethacrylate

Structure 5

$$CH_2{=}\overset{CH_3}{\underset{}{C}}{-}\underset{O}{\overset{}{C}}{-}O{-}CH_2{-}\underset{OH}{\overset{}{CH}}{-}CH_2{-}OH$$

Sulfoxide containing methacrylates (SMA) and sulfoxide containing acrylate (SA) are a preferred constituent of the present invention. The concentration of SMA and/or SA is in the range of approximately 5% to approximately 70% by weight, and preferably in the range of approximately 10% to approximately 50% by weight, depending on water content and other desired properties of the resulting hydrogels.

To obtain a greater water content ionic hydrogel, the preferred additional comonomers in the present invention are methacrylic acid and acrylic acid whose general chemical structures are show in Structure 6.

(Meth)acrylic acid

Structure 6

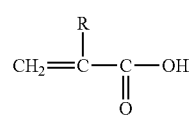

Where R can be either H or $CH_3$

The concentration of additional comonomers in the present invention is typically in the range of 0% to 80% by weight, and preferably in the range of 0% to 60%, depending upon the type of comonomer used, the water content, and other desired properties of the resulting hydrogel.

To form a hydrophilic hydrogel the use of crosslinker is required. Typically, the crosslinkers are di-functional or multi-functional compounds that can incorporate themselves into the resulting polymer backbone during the polymerization process. Examples of crosslinkers include, but are not limited to, ethyleneglycol di(meth)acrylate, triethyleneglycol di(meth)acrylate, tetraethylene glycol di(meth)acrylate, trimethylopropane tri(meth)acrylate, bisphenol A di(meth) acrylate, ethoxylate bisphenol A di(meth)acrylate, pentaerythritol tri-, and tetra(meth)acrylate, tetramethylene di(meth)acrylate, methylenebisacrylamide, methacryloxyethyl vinyl carbonate, triallylcyanurate, methacryloxyethyl vinyl urea, divinyl benzene, diallyl itaconate, allyl methacrylate, diallyl phthalate, polysiloxanylbisalkyl (meth) acrylate, polyethylene glycol di(meth)acrylate, and the like. The preferred crosslinker in the present invention is polyethylene glycol dimethacrylate having the molecular weight of approximately 400 or approximately 1000, as illustrated in Structure 7.

Polyethylene glycol dimethacrylate

Structure 7

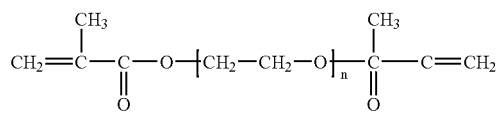

Where n is an integral indicating the number of repeating unit for a specific molecular weight. In the case of molecular weight of approximately 400 and approximately 1000, n is 5 and 19, respectively.

The concentration of crosslinking agent is chosen according to the required degree of crosslinking and consequently it is determined not only by the amount of the crosslinker but by the type and ability to form the crosslinked polymer. The less effective crosslinking agents have to be applied in a higher concentration than the more effective ones, and while in general up to 8% by weight of the crosslinker is possible, preferably, the more effective crosslinkers are present up to 3% by weight.

The polymers of the present invention are preferentially prepared by radical polymerization utilizing the free radical initiators. Generally, E-beam, ultraviolet, microwave, and thermal process are used to initiate the polymerization. Preferably, ultraviolet and/or thermal polymerization are used alone or in combination. The thermal initiators are preferably either azo- or peroxide families, including but not being limited to, 2,2'-azobisisobutyronitrile (AIBN), 1,1'-azodi (hexahydrobenzonitrile), 2,2'-azobis (2,4-dimethylpentanenitrile), 4,4'-azobis (4-cyanopentanoic acid), 2,2'-azobis (2-methylbutanenitrile), 2,2'-azobis(2,4-dimethyl-4-methoxylvaleronitrile), t-butyl peroctoate, benzoyl peroxide, lauroyl peroxide, methyl ethyl ketone peroxide, 2,4-olichlorobenzoyl peroxide, p-chlorobenzoyl peroxide, di-isopropyl peroxycarbonate, 2,5-dimethyl-2,5-di(2-ethylhexanoylperoxy) hexane, and the like. More preferably, the thermal initiators are AIBN and 1,1-azodi (hexahydrobenzonitrile) in the present invention. The photoinitiators useful in the present invention include, but are not limited to, hydroxyalkylphenone such as 2-hydroxy-2-methyl-1-phenyl-1-propanono (DAROCUR® 1173), benzoin methyl ether (BME), and 2,2-dimethoxy-2-phenylacetophenone.

The concentration of initiators used may be, for example, from 0.01% to 5% by weight, and is preferably from 0.2% to 1% by weight. If the quantity of initiators is too low, the resulting hydrogel may not be sufficiently resilient to spring back quickly or completely after folding and if the quantity is too high, a stiff but less elastic resulting hydrogel may be formed.

To impart specific properties to the resulting hydrogel, additives are useful. For instance, an ultraviolet (UV) absorbing material is added to reduce penetration of UV radiation in the hydrogel in the wavelength of 300 to 410 nm. Of particular interest are the benzophenone and benzotriazole famlies of UV absorbers, such as 2,2'-dihydroxy-4-methacryloyloxybenzophenone, 2,2'-dihydroxy-4,4'-dimethacryloyl'-oxybenzophene, 2-hydroxy-4-(3-methacryloyloxy-2-hydroxypropoxy) benzophenone, 2,2'-dihydroxy-4,4'-(3-bismethacrylo-yloxy-2-hydroxypropoxy) benzophenone, 1-, 4-, 5-, 6-, or 7-vinylbenzotriazole 4-, 5-, 6-, 7-, methacryloyloxybenzotriazole, 1-methacryloylbenzotriazole, 4-, 5-, 6-, or 7-methacryloyloxy-2-hydroxypropoxybenzotriazole, 1-(methacryloyloxy-2-hydroxypropoxy) benzotriazole, and the like. Among these UV absorbing materials, 2-hydroxy-4-acrylyloxyethoxy benzophenone is preferably used in the present invention in a concentration range of 0.01% to 1%, and more preferably in a range of 0.1% to 0.4% by weight.

In addition, other additives such as handling colorant can also be employed in the hydrogel composition. Typical handling colorant is copper phthalocyanine blue in the present invention in a very small quantity that has been commonly used in the contact lens manufacture.

The polymers used in the present invention as IPN agents are those that are homogeneously miscible with the monomer mixture at ambient temperature. These IPN agents are typically water soluble polymers including polyvinylpyrrolidone (PVP) having a weight average molecular weight of 10,000 to 100,000 and preferably in the range of 30,000 to 80,000, as illustrated in Structure 8; poly-2-ethyl-2-oxazoline (PEOX) having a molecular weight of 10,000 to 1,000, 000; and preferably in the range of 50,000 to 500,000, as shown in Structure 9; polyglycerol methacrylate as illustrated in Structure 10; and polyvinyl-pyrrolidone-iodine complex, as illustrated in Structure 11.

A prominent feature of the IPN agents of the present invention, is water solubility due to hydrophilic groups, such as =N—C(=O)— groups. Examples of polymers containing =N—C(=O)— groups include: polyvinylpyrrolidone (PVP); polyvinyloxazolidone; polyvinylmethyloxazolidone; polyacrylamide and N-substituted polyacrylamides, wherein R groups are independently selected from H and C1-C6 alkyl groups, e.g., methyl, ethyl, propyl, or isopropyl, or two R groups can form a 5 or 6 member ring structure; polymethacrylamide and N-substituted polymethacrylamides, wherein R groups are as described above; poly(N-acrylylglycinamide); poly(N-methacrylylglycinamide); poly(2-ethyl-2-oxazoline) (PEOX); and polyvinylurethane, wherein each R group is as described above. These polymers have an amphiphilic character with polar groups conferring hydrophilic properties and apolar groups conferring hydrophobic properties. Of course the strength of any particular polar group, and combinations thereof, are variables considered within the scope of the present invention. Detailed description of physicochemical properties of some of these polymers are given in "Water-Soluble Synthetic Polymers: Properties and Behavior," Vol. 1, Philip Molyneux, CRC Press, 1983. These polymers are also useful in the present invention in partially hydrolyzed and/or crosslinked forms.

PVP, also known as povidone, is available in weight average molecular weights ranging from approximately 1,000 to approximately 1,000,000. Due to its widespread use as a suspending or dispersing agent, in certain embodiments of the present invention, materials are suspended or dispersed in PVP to form a pre-mix. The same method of use applies to the aforementioned =N—C(=O)— group containing polymers.

PVP-Iodine, also known as povidone-iodine (PVP-$I_2$), has known anti-infective properties. The same method of use applies to the aforementioned =N—C(=O)— group containing polymers wherein iodine is present. These particular polymers also have the potential for UV absorption. Under such circumstances, the concentration of UV initiator is adjustable to compensate for processes relying on UV initiated polymerization.

N-oxides of heterocyclic compounds such as the N-oxides of pyridine, pyrrole, imidazole, pyrazole, pyrazine, pyrimidine, pyridazine, piperidine, pyrrolidone, azolidine, morpholine, and derivatives thereof are also useable alone or in combination with the aforementioned polymers. For example, poly(4-vinylpyridine N-oxide) (PVNO) is useable alone or in combination with PVP and/or PVP-$I_2$.

Structures of some of the aforementioned polymers follow:

Polyvinylpyrrolidone (PVP)

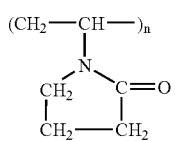

Structure 8

Where n is an integral indicating the number of repeating unit of monomer for constructing the polymer.

Poly-2-ethyl-2-oxazoline (PEOX)

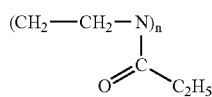

Structure 9

Where n is an integral indicating the number of repeating unit of monomer for constructing the polymer.

Polyglycerol methacrylate

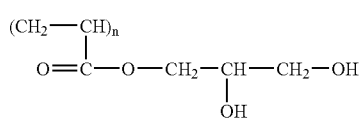

Structure 10

Where n is an integral indicating the number of repeating unit of monomer for constructing the polymer.

Polyvinylpyrrolidone-iodine (PVP-$I_2$) complex

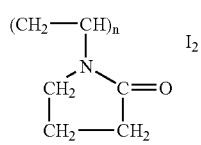

Structure 11

Where n is an integral indicating the number of repeating monomeric units for a specific molecular weight.

The concentration of IPN agents used in the present invention is typically in the range of 1% to 14%, but preferably in the range of 5% to 10% depending upon the desired properties of the resulting hydrogels. It has been found that if a higher concentration is used, the resulting hydrogel generally has a higher water content but with a weaker mechanical strength. Surprisingly, when polyvinylpyrrolidone (PVP) is used as an IPN agent in a concentration greater than 5%, the resulting hydrogel exhibits a noticeable low degree of surface friction differing greatly from the surface friction characteristics of other hydrophilic hydrogels comprising conventional monomers made through a non-IPN process. Furthermore, the hydrophilic hydrogels prepared by the IPN process using PVP as an IPN agent show markedly lower water loss that is attributable to dehydration when compared to non-IPN processed analogues. This suggests that the IPN agents such as PVP present in the hydrophilic hydrogel have a higher degree of water attraction ability that in turn prevents water evaporation from the hydrogel surface. In addition, the IPN processed hydrogel shows a lower protein and a lower lipid absorption rate than other non-IPN processed hydrogels when an artificial tear fluid is tested at 37° C. for 7 days.

Polymers according to the invention can be produced by a variety of methods, such as bulk polymerization, solution polymerization, or possibly suspension polymerization in non-aqueous solution. Preferably bulk polymerization is used in the present invention. It is possible to polymerize purely by a thermal process, a photochemical process, or by combining both of these processes. It is also possible to perform polymerization using microwave or E-beam as the energy source. When a combination of polymerization by thermal process and photochemical process is employed, it is preferable first to proceed using an ultraviolet photochemical process followed by a thermal process. During the thermal polymerization process, if desired, the polymerization temperature is maintained as a constant throughout the entire thermal process, or alternatively, increased in a stepwise or continuous manner.

The polymeric material obtained by polymerization of the polymerizable compositions according to the present invention is manufacturable by first dispensing the composition directly in a mold having a desired form and then by performing the polymerization of the polymerizable composition in the mold. When the polymeric material is a finished resulting polymer, the surfaces of the mold should have the geometry which is the counter part of the resulting polymer. However, when the polymeric material produced is not a finished material, the conventional machining operation such as lathing can be used to produce the material of the desired geometry.

It is also possible to produce a semi-finished polymeric material, exhibiting one of its surfaces whose geometry is defined, the other surface being the subject of a machine operation, for instance lathing, after it has been obtained in order to produce the finished polymeric material. To produce the semi-finished polymeric material, it is also possible to proceed either by static molding or optionally by performing a rotary spin casting.

The hydrated polymeric materials, i.e., hydrophilic hydrogels, in the present invention are obtainable by subjecting the finished polymer to hydration in deionized water, an aqueous salt solution, an aqueous surfactant solution, an alcoholic aqueous solution at ambient or elevated temperature for a sufficient period of time to reach a fully hydrated state, or combinations thereof.

The following examples illustrate the present invention in greater detail, but are not intended to limit the scope thereof in any way.

Water Content

The hydrated lens samples (10 pieces) were lightly blotted using an optical cloth and immediately transferred to an analytical balance (±0.0001 g in precision) and weighed. The lens samples were then placed in a thermal oven at 120° C. for 16 hours to dehydrate the lens samples, and finally weighed again on the same balance. The water content was calculated according to the equation below.

Water Content (%)=(wet weight of lens−dry weight of lens)÷dry weight of lens

Light Transmittance

The light transmittance of lens samples in saline was measured using a Beckman DU-64 spectrophotometer scanning from 400 nm to 800 nm at a speed of 750 nm/minute. The light transmittance of lens was expressed in %.

Lens Dehydration Rate

This testing procedure was developed as an in vitro method to measure the amount of water loss from the hydrophilic hydrogel contact lens under controlled humidity and temperature (humidity was controlled at 75±2% and temperature was controlled at 24° C.±1° C.). A given hydrated lens sample was first placed in UNISOL® 4 preservative free, pH balanced saline solution for 10 minutes for equilibration, then removed and gently blotted using an optical cloth to remove the surface water on the lens sample for about 3 seconds. The lens sample was then immediately placed on an analytical balance with a precision of ±0.0001 g and the initial weight was recorded and the value output through an automatic printer. Subsequently, the weight of the lens sample was recorded periodically at 30 seconds intervals for a period of 5 minutes. The initial weight and the final weight (5 minutes) were used to determine the percentage of water loss of the lens sample according to the following equation.

Water Loss (%)=[(final weight of lens sample÷initial weight of lens sample)−1]÷% of Water Content of lens sample Table 1, below, lists absolute values of Water Loss, per the aforementioned equation, including a comparison of various lenses prepared in the examples that follow. The water loss data of each lens sample represents an average from at least 3 measured values.

TABLE 1

| Lens Sample | Major Components | Water Loss (%) |
|---|---|---|
| Example 1 | HEMA/sulfoxide containing acrylate/PVP | 3.1 |
| Example 2 | HEMA/sulfoxide containing acrylate/PVP | 3.0 |
| Example 6 | HEMA/MAA | 6.0 |
| Example 7 | HEMA/MAA/PVP | 3.3 |
| Example 8 | HEMA/MAA/PVP | 3.1 |
| Example 9 | HEMA/MAA | 8.4 |
| [1]PROCLEAR ® | Omafilcon | 5.4 |
| [2]BENZ-G ® 5X | Hioxifilcon | 8.6 |
| [3]FOCUS ® | Vifilcon | 14.3 |
| [3]FOCUS DAILIES ® | Nelficon | 11.0 |

[1]PROCLEAR ® (Biocompatibles Ltd., Middlesex, England) lens is recognized in the market as an index lens providing improved comfort for contact lens wearers who experience discomfort or symptoms related to dryness during wear.
[2]BENZ-G ® 5X (Benz Research and Development Corp., Sarasota, Florida)
[3]FOCUS ® and DAILIES ® (Ciba-Geigy Corp., New York, New York)

Degree of Polymerization

After preparation, and removal from the mold, each dry lens sample was weighed using an analytical balance (±0.0001 g precision). The weighed lens sample was hydrated, first in deionized water—repeated 2 times with agitation for about 30 minutes each time, then in a 15% isopropanol aqueous solution for about 30 minutes, and finally, two times in an aqueous saline solution with agitation for about 30 minutes each time. After hydration, each lens sample was gently blotted using an optical cloth, placed in a thermal oven at 120° C. for 16 hours, and finally weighed again. The degree of polymerization expressed in % was calculated according to the equation below.

Degree of Polymerization (%)=(initial dry weight of lens−final dry weight of lens)÷initial dry weight of lens Synthesis of Methyl 3-(Acryloyloxy) Propyl Sulfoxide 250 g of 3-methylthio-1-propanol and 500 mL of triethylamine was added, with agitation, to a 5 L, 2-neck round-bottom flask containing 2500 mL of 4 Å molecular sieve dried methylene chloride chilled in a cooling bath at −1° C. A mixture of 304 g of acryloyl chloride with 250 mL of 4 Å molecular sieve dried methylene chloride was transferred to the flask dropwise using a peristaltic pump at a rate of approximately 1 drop per 3 seconds. The reaction mixture was continuously agitated after the completion of acryloyl chloride addition for an additional 2 hours, and then warmed to room temperature. The reaction mixture was washed with deionized water (4 times with 1 L), saturated sodium bicarbonate solution (2 times with 100 mL), and again with deionized water (2 times with 1 L). After separation, the methylene chloride layer of the mixture was directly used in the subsequent oxidation outlined below.

The methylene chloride solution containing crude 3-methylthio-1-propyl acrylate was transferred to a 3 L, 2-neck round-bottomed flask in a cooling bath at −1° C. with agitation. To this flask, 370 g of 3-chloroperoxybenzoic acid powder (76.5 wt % average activity) was slowly added in portions over a period of about 24 hours while the mixture temperature was strictly maintained below 0° C. After the substantial completion of the reaction, the mixture was evaporated using a rotary evaporator to strip off the solvent at 40° C. The slurry residue was then extracted with deionized water (4 times with 1 L) and filtered. The extraction procedure was conducted at room temperature with vigorous agitation. The extractant collected was mixed and stirred with 120 g of Bio-Rad anion exchange resin (OH form) for 6 hours, and filtered. The filtrate was then evaporated under reduce pressure at 50° C. to obtain a light brownish-yellow crude methyl-3-acryloyloxy propyl sulfoxide. The final purification of methyl 3-acryloyloxy propyl sulfoxide was conducted using a vacuum distillation technique to obtain a colorless oil product.

INDUSTRIAL APPLICABILITY

The invention is further illustrated by the following non-limiting examples.

EXAMPLE 1

62.35 parts of 2-hydroxyethylmethacrylate (99.5% minimal purity), 20 parts of methyl 3-(acryloyloxy) propyl sulfoxide, 1.25 parts of polyethylene glycol (400) dimethacrylate, 1 part of polyethylene glycol (1000) dimethacrylate, and 0.5 parts of methacrylic acid were thoroughly mixed using a magnetic stirring bar. To this homogeneous solution, 14 parts of polyvinylpyrrolidone (PVP), having a molecular weight of about 38,000, was slowly added with agitation. Upon completion of this base mix, 0.5 parts of 2-hydroxy-2-methyl-1-phenyl-1-propanon (DAROCUR® 1173), 0.15 parts of 1,1'-azodi(hexahydrobenzonitrile), along with 0.25 parts of 2-hydroxy-4-acryloyloxyethoxy benzophenone were added in darkness with agitation.

The mixture was then filtered through a 1.0 µm polypropylene filter to remove any undissolved particles, followed by a vacuum degassing to remove oxygen and air bubbles present in the filtered mixture for 5 minutes at ambient temperature. The degassed solution was then dispensed to polypropylene female lens molds in an approximate amount of 30 µl to 60 µl for each mold. After dispensing, the female molds were capped slowly with corresponding polypropylene male lens molds. The assembly was then subject to UV polymerization using a UV light with an approximate energy level of 4 watts/inch² for 4 to 5 minutes with no nitrogen blanket. After UV polymerization, the assembly was immediately transferred to a thermal oven for thermal curing at 105° C. for 1 hour followed by 170° C. for an additional hour. Upon completion of polymerization, the assembly was removed from the oven, and opened to separate the lens from the molds. The dry lens sample was hydrated, first in deionized water—repeated 2 times with agitation for about 30 minutes each time, then in a 15% isopropanol aqueous solution for about 30 minutes, and finally, two times in an aqueous saline solution with agitation for about 30 minutes each time.

The hydrated lens so prepared shows a light transmittance greater than 98%, the degree of polymerization above 95% based on the gravimetric analysis of the dry lens and the re-dried hydrated lens, water content about 60%, and a low degree of surface friction that is especially tactilely noticeable.

EXAMPLE 1

| | |
|---|---|
| HEMA (99.5%) | 62.35 |
| methyl 3-(acryloyloxy) propyl sulfoxide | 20 |
| PEG 400 dimethacrylate | 1.25 |
| PEG 1000 dimethacrylate | 1 |
| Methacrylic acid | 0.5 |
| PVP (approx. 38 K) | 14 |
| 2-hydroxy-2-methyl-1-phenyl-1-propanon | 0.5 |
| 1,1'-azodi(hexahydrobezonitrile) | 0.15 |
| 2-hydroxy-4-acrylyloxyethoxy benzophenone | 0.25 |
| TOTAL | 100 |

EXAMPLE 2

62 parts of 2-hydroxyethylmethacrylate (99.5% minimal purity), 20 parts of methyl 3-(acryloyloxy) propyl sulfoxide, 1.25 parts of polyethylene glycol (400) dimethacrylate, 1 part of polyethylene glycol (1000) dimethacrylate and 0.5 parts of methacrylic acid were mixed thoroughly. To this solution 14 parts of polyvinylpyrrolidone, having a molecular weight of about 38,000, was slowly added with vigorous agitation. After this, 0.5 parts of 2-hydroxy-2-methyl-1-phenyl-1-propanone (DAROCUR® 1173), 0.5 parts 2,2'-azobisisobutyzonitrile (AIBN), and 0.25 parts of 2-hydroxy-4-acrylyloxyethoxy benzophenone were added to the solution in darkness with agitation.

The mixture was then filtered, degassed, dispensed in the polypropylene molds, and UV polymerized in the same manner as described in Example 1. After UV polymerization, the assembly was immediately subject to thermal curing at 105° C. for 1 hour, followed by 120° C. for an additional 4 hours.

Upon completion of polymerization, the dry lens hydration procedure was carried out in a similar manner as that described in Example 1 without any variation. The hydrated lens so prepared has similar properties to that prepared in Example 1.

EXAMPLE 2

| | |
|---|---|
| HEMA (99.5%) | 62 |
| methyl 3-(acryloyloxy) propyl sulfoxide | 20 |
| PEG 400 dimethacrylate | 1.25 |
| PEG 1000 dimethacrylate | 1 |
| Methacrylic acid | 0.5 |
| PVP (approx. 38 K) | 14 |
| 2-hydroxy-2-methyl-1-phenyl-1-propanon | 0.5 |
| 2,2'-azobisisobutyzonitrile (AIBN) | 0.5 |
| 2-hydroxy-4-acrylyloxyethoxy benzophenone | 0.25 |
| TOTAL | 100 |

EXAMPLE 3

59 parts of 2-hydroxyethylmethacrylate (99.5% minimal purity), 25 parts of N-vinylpyrrolidone, 1 part of polyethylene glycol (1000) dimethacrylate, 1 part of polyethylene glycol (400) dimethylacrylate were mixed thoroughly to form a homogeneous solution. To this solution was added 14 parts to polyvinylpyrrolidone having a molecular weight of about 38,000 slowly with agitation. Upon completion of the base solution preparation, 0.1 parts of 2-hydroxy-2-methyl-1-phenyl-1-propanone (DAROCUR® 1173), 0.5 parts of 2,2'-azobisisobutyronitrile (AIBN), and 0.25 parts of 2-hydroxy-4-acryloxyethoxybenzophenone were added to the above solution with agitation at dark.

The solution was then filtered, degassed, dispensed, UV and thermally cured in the same manner as those described in Example 1 except that the thermal curing process was conducted at 120° C. for 4 hours. After polymerization, the dry lens hydration procedure was performed in a similar was as that described in Example 1.

EXAMPLE 3

| | |
|---|---|
| HEMA (99.5%) | 59 |
| N-vinylpyrrolidone | 25 |
| PEG 400 dimethacrylate | 1 |
| PEG 1000 dimethacrylate | 1 |
| PVP (approx. 38 K) | 14 |
| 2-hydroxy-2-methyl-1-phenyl-1-propanon | 0.1 |
| 2,2'-azobisisobutyzonitrile (AIBN) | 0.5 |
| 2-hydroxy-4-acrylyloxyethoxy benzophenone | 0.25 |
| TOTAL | 101 |

EXAMPLE 4

86.8 part of 2-hydroxyethylmethacrylate (99.5% minimal purity), 1.8 parts of methacrylic acid, and 0.4 parts of ethylene glycol dimethacrylate were thoroughly mixed at ambient temperature. To this solution was added 10 parts of polyvinylpyrrolidone having a molecular weight of about 38,000 slowly with vigorous agitation. After this, 0.25 parts of 2-hydroxy-2-methyl-1-phenyl-1-propanone (DAROCUR® 1173), 0.5 parts of 2,2'-azobisisobutyronitrile (AIBN), and 0.25 parts of 2-hydroxy-4-acryloxyethoxy benzophenone were then added to the solution at dark with agitation.

The solution was finally filtered, degassed, dispensed, cured, and hydrated in a way identical to those described in Example 3, except that the thermal curing process was conducted at 120° C. for 2 hours.

EXAMPLE 4

| | |
|---|---|
| HEMA (99.5%) | 86.8 |
| methacrylic acid | 1.8 |
| ethylene glycol dimethacrylate | 0.4 |
| PVP (approx. 38 K) | 10 |
| 2-hydroxy-2-methyl-1-phenyl-1-propanon | 0.25 |
| 2-2'-azobisisobutyzonitrile (AIBN) | 0.5 |
| 2-hydroxy-4-acrylyloxyethoxy benzophenone | 0.25 |
| TOTAL | 100 |

EXAMPLE 5

62 part of 2-hydroxyethyl methacrylate (99.5% minimal purity), 0.5 parts of methacrylic acid, 20 parts of N-vinylpyrrolidone, 1.25 parts of polyethylene glycol (400) dimethacrylate, and 1 part of polyethylene glycol (1000) dimethacrylate were mixed together thoroughly. To this solution was added 14 parts of polyvinylpyrrolidone having a molecular of 38,000 slowly with agitation. Then, 0.5 parts of 2-hydroxy-2-methyl-1-phenyl-1-propanone (DAROCUR® 1173), 0.5 parts of 2,2'-azobisisobutyronitrile (AIBN), and 0.25 parts of 2-hydroxy-4-acryloxyethoxy benzophenone were added to the above solution with agitation at dark.

The solution was finally filtered, degassed, dispensed, cured, and hydrated in a similar way to those described in Example 3.

EXAMPLE 5

| | |
|---|---|
| HEMA (99.5%) | 62 |
| methacrylic acid | 0.5 |
| N-vinyl pyrrolidone | 20 |
| polyethylene glycol (400) dimethacrylate | 1.25 |
| polyethylene glycol (1000) dimethacrylate | 1 |
| PVP (approx. 38 K) | 14 |
| 2-hydroxy-2-methyl-1-phenyl-1-propanon | 0.5 |
| 2,2'-azobisisobutyzonitrile (AIBN) | 0.5 |
| 2-hydroxy-4-acrylyloxyethoxy benzophenone | 0.25 |
| TOTAL | 100 |

EXAMPLE 6

98.15 parts of 2-hydroxyethyl methacrylate (99.5% minimal purity), 0.5 parts of methacrylic acid, and 0.35 parts of ethylene glycol dimethacrylate were mixed thoroughly using a magnetic stirrer. To this solution was added 0.5 parts of 2,2'-azobisisobutyronitrile (AIBN), 0.25 parts of 2-hydroxy-2-methyl-1-phenyl-1-propanone (DAROCUR® 1173), and 0.25 parts of 2-hydroxy-4-acrylyloxyethoxy benzophenone with agitation at dark.

The solution was filtered, degassed, dispensed, polymerized, and lens hydration was then carried out in the similar manner to those described in Example 1, except that UV curing was conducted for 5 to 12 minutes and the thermal curing was performed at 120° C. for 4 hours.

EXAMPLE 6

| | |
|---|---|
| HEMA (99.5%) | 98.15 |
| methacrylic acid | 0.5 |
| ethylene glycol dimethacrylate | 0.35 |
| 2-hydroxy-2-methyl-1-phenyl-1-propanon | 0.25 |
| 2,2'-azobisisobutyzonitrile (AIBN) | 0.5 |
| 2-hydroxy-4-acrylyloxyethoxy benzophenone | 0.25 |
| TOTAL | 100 |

EXAMPLE 7

The lens preparation was conducted in the same way as that described in Example 6, except that 10% of polyvinylpyrrolidone having a molecular weight of about 38,000 as an IPN agent was added to the monomer mix.

EXAMPLE 7

| | |
|---|---|
| HEMA (99.5%) | 88.15 |
| methacrylic acid | 0.5 |
| ethylene glycol dimethacrylate | 0.35 |
| PVP (approx. 38 K) | 10 |
| 2-hydroxy-2-methyl-1-phenyl-1-propanon | 0.25 |

-continued

| | |
|---|---|
| 2,2'-azobisisobutyzonitrile (AIBN) | 0.5 |
| 2-hydroxy-4-acrylyloxyethoxy benzophenone | 0.25 |
| TOTAL | 100 |

EXAMPLE 8

86.86 parts of 2-hydroxyethyl methacrylate (99.5% minimal purity), 2 parts of methacrylic acid, and 0.14 parts of ethylene glycol dimethacrylate were mixed together. Then, 10 parts of polyvinylpyrrolidone having a molecular weight of about 38,000 was added to the above solution slowly with vigorous agitation. To this solution, 0.5 parts of 2,2'-azobisisobutyronitrile (AIBN), 0.25 parts of 2-hydroxy-2-methyl-1-phenyl-1-propanone (DAROCUR® 1173), 0.25 parts of 2-hydroxy-4-acrylyloxyethoxy benzophenone with agitation at dark. The lens was then prepared in the same manner as described in Example 6.

EXAMPLE 8

| | |
|---|---|
| HEMA (99.5%) | 86.86 |
| methacrylic acid | 2 |
| ethylene glycol dimethacrylate | 0.14 |
| PVP (approx. 38 K) | 10 |
| 2-hydroxy-2-methyl-1-phenyl-1-propanon | 0.25 |
| 2,2'-azobisisobutyzonitrile (AIBN) | 0.5 |
| 2-hydroxy-4-acrylyloxyethoxy benzophenone | 0.25 |
| TOTAL | 100 |

EXAMPLE 9

96.36 parts of 2-hydroxyethyl methacrylate (99.5% minimal purity), 2.04 parts of methacrylic acid, and 0.6 parts of ethylene glycol dimethacrylate were thoroughly mixed. To this solution were added 0.5 parts of 2,2'-azobisisobutyronitrile (AIBN), and 0.5 parts of benzoin methyl ether (BME) with agitation at dark.

The monomer mix was filtered, degassed, dispensed in a polypropylene mold having semi-spherical shape, and cured under a UV light with an approximate energy of 17 watts/inch$^2$ for 7 minutes with a nitrogen blanket for 6 minutes, followed by a thermal post curing at 70° C. for 7 to 9 hours. The semi-finished lens blank was finally lathed and hydrated in a manner similar to that described in Example 1.

EXAMPLE 9

| | |
|---|---|
| HEMA (99.5%) | 96.36 |
| methacrylic acid | 2.04 |
| ethylene glycol dimethacrylate | 0.6 |
| 2,2'-azobisisobutyzonitrile (AIBN) | 0.5 |
| benzoin methyl ether (BME) | 0.5 |
| TOTAL | 100 |

The preceding examples can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A contact lens comprising:
   a molded lens body comprising a hydrogel interpenetrating polymer network composition comprising
      a first hydrophilic polymer component formed from a polymerization of one or more monomers and a crosslinker that crosslinks said one or more monomers, and said polymerization taking place in the presence of a pre-formed second hydrophilic polymer component; and
      said pre-formed second hydrophilic polymer component interpenetrating the first hydrophilic polymer component, the second polymer component being water soluble,
   the molded lens body having an increased water retention relative to an identical lens body without the second polymer component, wherein said second hydrophilic polymer component is present in an amount of from 5% to 10% based on the weight of said hydrogel composition.

2. The contact lens of claim 1, wherein the first hydrophilic polymer component includes units from a silicon-containing monomer.

3. The contact lens of claim 1, wherein the second polymer component is selected from the group consisting of
   (A) at least one polymer comprising one or more monomeric units comprising at least one =N—C(=O)— group;
   (B) at least one polymer comprising one or more monomeric units comprising at least one N-oxide group;
   (C) at least one polymer comprising both =N—C (=O)— and N-oxide groups of(A) and (B); and
   (D) mixtures thereof.

4. The contact lens of claim 1, wherein the first polymeric component comprises a methacrylate polymer and the second polymeric component comprises a pyrrolidone polymer.

5. The contact lens of claim 4, wherein the first polymeric component comprises 2-hydroxyethyl methacrylate and the second polymeric component comprises polyvinylpyrrolidone.

6. The contact lens of claim 1, wherein the first polymer component includes units from a monomer provided in an amount from 5% (w/w) to about 95% (w/w).

7. The contact lens of claim 1, wherein the first polymer component includes units from a monomer provided in an amount from 20% (w/w) to about 85% (w/w).

8. The contact lens of claim 1, further comprising a hydrophilic comonomer effective in forming a hydrogel composition having a water content greater than 40%.

9. The contact lens of claim 8, wherein the hydrophilic comonomer is acrylic acid, methacrylic acid, sulfoxide containing (meth)acrylate, N-vinylpyrrolidone, 2-acrylamido-2-methylpropanesulfonic acid and its salts, vinyl sulfonic acid and its salts, styrenesulfonic acid and its salts, 3-methacryloyloxy propyl sulfonic acid and its salts, allylsulfonic acid, 2-methacryloyloxyethyltrimethylammonium salts, N,N,N-trimethylammonium salts, diallyl-dimethylammonium salts, polyethylene glycol (400) monomethyl ether monomethacrylate, or glycerol monomethacrylate, or mixtures thereof.

10. The contact lens of claim 1, wherein the hydrogel composition further comprises a crosslinker selected from ethyleneglycol di(meth)acrylate, triethyleneglycol di(meth)acrylate, tetraethyleneglycol di(meth)acrylate, trimethylopropane tri(meth)acrylate, bisphenol A di(meth)acrylate, ethoxylate bisphenol A di(meth)acrylate, pentaerythritol tri-, and tetra(meth)acrylate, tetramethylene di(meth)acrylate, methylenebisacrylamide, methacryloxyethyl vinyl carbonate, triallylcyanurate, methacryloxyethyl vinyl urea, divinyl benzene, diallyl itaconate, allyl methacrylate, diallyl phthalate, polysiloxanylbisalkyl (meth)acrylate, or polyethyleneglycol di(meth)acrylate, or mixtures thereof.

11. The contact lens of claim 1, wherein the second polymer component comprises a polymer having a weight average molecular weight from about 10,000 to 1,000,000.

12. The contact lens of claim 1, wherein the lens body has a water retention of at least 96%.

13. The contact lens of claim 1, wherein the first hydrophilic polymer component is dimethyl diphenyl methylvinyl siloxane; X-(dimethylvinylsilyl)-w-[(dimethylvinylsilyl)oxy]-dimethyl diphenyl methylvinyl siloxane; vinyl [3-[3,3,3-trimethyl- 1,1-bis(trimethylsiloxy-)disiloxany]propyl] carbonate; or 4,4'-(tetrapentacontmethyl-hepta-cosasiloxanylene)di-1-butanol), or combinations thereof.

14. The contact lens of claim 1, wherein the second hydrophilic polymer component is polyvinylpyrrolidone.

15. The contact lens of claim 14, wherein the polyvinylpyrrolidone has a weight average molecular weight greater than 10,000.

16. The contact lens of claim 14, wherein the polyvinylpyrrolidone has a weight average molecular weight less than 1,000,000.

17. The contact lens of claim 14, wherein the polyvinylpyrrolidone has a weight average molecular weight from 10,000 to 100,000.

18. The contact lens of claim 14, wherein the polyvinylpyrrolidone has a weight average molecular weight from 30,000 to 80,000.

19. The contact lens of claim 1, wherein the polymerization takes place in the presence of an ultraviolet absorbing agent, polymerization initiator, colorant, or antiseptic agent, or any combination thereof.

20. The contact lens of claim 1, wherein said crosslinker is polyethylene glycol dimethacrylate, or ethylene glycol dimethacrylate, or any combination thereof.

21. The contact lens of claim 1, wherein the crosslinker is present in an amount from approximately 0.1 wt % to approximately 8 wt %.

22. The contact lens of claim 1, wherein said contact lens is a spherical contact lens, aspherical contact lens, or toric contact lens.

23. The contact lens of claim 1, wherein said crosslinker is ethyleneglycol di(meth)acrylate, triethyleneglycol di(meth)acrylate, tetraethyleneglycol di(meth)acrylate, trimethylopropane tri(meth)acrylate, bisphenol A di(meth)acrylate, ethoxylate bisphenol A di(meth)acrylate, pentaerythritol tri-, and tetra(meth)acrylate, tetramethylene di(meth)acrylate, methylenebisacrylamide, methacryloxyethyl vinyl carbonate, triallylcyanurate, methacryloxyethyl vinyl urea, divinyl benzene, diallyl itaconate, allyl methacrylate, diallyl phthalate, polysiloxanylbisalkyl (meth)acrylate, or polyethyleneglycol di(meth)acrylate, or mixtures thereof.

24. A molded contact lens comprising a polymerized reaction product of at least one polymerizable monomer and a crosslinker, wherein said polymerized reaction product is formed in the presence of a polyvinylpyrrolidone having a weight average molecular weight of at least 10,000, the polyvinylpyrrolidone being present in the composition in an amount from approximately 1% to 14%.

25. The molded contact lens of claim 24, wherein the polyvinylpyrrolidone has a weight average molecular weight less than 1,000,000.

26. The molded contact lens of claim 24, wherein the polyvinylpyrrolidone has a weight average molecular weight from 10,000 to 100,000.

27. The molded contact lens of claim 26, wherein the polyvinylpyrrolidone has a weight average molecular weight from 30,000 to 80,000.

28. The molded contact lens of claim 24, wherein the polyvinylpyrrolidone is present in an amount from 5 wt % to approximately 10 wt %.

29. The molded contact lens of claim 24, wherein said reaction product includes in the reaction an ultraviolet absorbing agent, a polymerization initiator, a colorant, or an antiseptic agent, or combinations thereof.

30. The molded contact lens of claim 24, wherein the reaction product is a radiated product that has been exposed to radiation.

31. The molded contact lens of claim 30, wherein the radiation is selected from the group consisting of E-beam radiation, ultraviolet radiation, thermal radiation, microwave radiation, and combinations thereof.

32. The molded contact lens of claim 30, wherein the reaction product is a thermal polymerized product, photochemical polymerized product, or a combination thereof.

33. The molded contact lens of claim 24, wherein said contact lens has a water retention of at least 96%.

34. The molded contact lens of claim 24, wherein said contact lens has a water content greater than 40% to about 60%.

35. The molded contact lens of claim 24 which is a contact lens selected from the group consisting of spherical contact lenses, aspherical contact lenses, and toric contact lenses.

36. The molded contact lens of claim 24 which has a reduced surface friction relative to a contact lens comprising the reaction product of an identical polymerizable composition without the polyvinylpyrollidone.

37. A contact lens comprising:
a molded lens body comprising a hydrogel interpenetrating polymer network composition comprising
a first polymer component formed from a polymerization of one or more monomers and a crosslinker that crosslinks said one or more monomers, and said polymerization taking place in the presence of a second hydrophilic polymer component; and
said second hydrophilic polymer component interpenetrating the first polymer component, the second hydrophilic polymer component being selected from the group consisting of polyvinylpyrrolidone, poly-2-ethyl-2-oxazoline, poly(4- vinylpyridine N-oxide) and combinations thereof,
wherein approximately 1 wt % to 14 wt % of the second hydrophilic polymer component is present.

38. The contact lens of claim 37, wherein the first polymeric component comprises a methacrylate polymer and the second polymeric component comprises a polyvinylpyrrolidone.

39. The contact lens of claim 38, wherein the first polymeric component comprises 2-hydroxyethyl methacrylate and the second polymeric component comprises polyvinylpyrrolidone.

40. The contact lens of claim 37, wherein the first polymer component includes units from a monomer provided in an amount from 5% (w/w) to about 95% (w/w).

41. The contact lens of claim 37, wherein the first polymer component includes units from a monomer provided in an amount from 20% (w/w) to about 85% (w/w).

42. The contact lens of claim 37, further comprising a hydrophilic comonomer effective in forming a hydrogel composition having a water content greater than 40% to about 60%.

43. The contact lens of claim 42, wherein the hydrophilic comonomer is acrylic acid, methacrylic acid, sulfoxide containing (meth)acrylate, N-vinylpyrrolidone, 2-acrylamido-2-methylpropanesulfonic acid and its salts, vinyl sulfonic acid and its salts, styrenesulfonic acid and its salts, 3-methacryloyloxy propyl sulfonic acid and its salts, allylsulfonic acid, 2-methacryloyloxyethyltrimethylammonium salts, N,N,N-trimethylammonium salts, diallyl-dimethylammonium salts, polyethylene glycol (400) monomethyl ether monomethacrylate, or glycerol monomethacrylate, or mixtures thereof.

44. The contact lens of claim 37, wherein the crosslinker is ethyleneglycol di(meth)acrylate, triethyleneglycol di(meth)acrylate, tetraethyleneglycol di(meth)acrylate, trimethylopropane tri(meth)acrylate, bisphenol A di(meth)acrylate, ethoxylate bisphenol A di(meth)acrylate, pentaerythritol tri-, and tetra(meth)acrylate, tetramethylene di(meth)acrylate, methylenebisacrylamide, methacryloxyethyl vinyl carbonate, triallylcyanurate, methacryloxyethyl vinyl urea, divinyl benzene, diallyl itaconate, allyl methacrylate, diallyl phthalate, polysiloxanylbisalkyl (meth)acrylate, or polyethyleneglycol di(meth)acrylate, or mixtures thereof.

45. The contact lens of claim 37, wherein the second polymer component comprises a polymer having a weight average molecular weight from about 10,000 to 1,000,000.

46. The contact lens of claim 37, wherein the second polymer component is provided in an amount greater than 5% to 10% by weight.

47. The contact lens of claim 37, wherein the second polymer component is polyvinylpyrrolidone provided in an amount greater than 5% to 10% by weight.

48. The contact lens of claim 37, wherein the lens body has a water retention of at least 96%.

49. A hydrogel contact lens comprising:
a molded lens body comprising a hydrogel interpenetrating polymer network composition comprising:
  (i) a first polymer component formed from a polymerization of one or more monomers and a crosslinker that crosslinks said one or more monomers, and said polymerization taking place in the presence of a polyvinylpyrrolidone; and
  (ii) said polyvinylpyrrolidone interpenetrating the first polymer component,
wherein approximately 1 wt % to 14 wt % of the polyvinylpyrrolidone component is present.

50. The contact lens of claim 49, wherein the first polymer component includes units from a monomer provided in an amount from 5% (w/w) to about 95% (w/w).

51. The contact lens of claim 49, further comprising a hydrophilic comonomer effective in forming a hydrogel composition having a water content greater than 40% to about 60%.

52. The contact lens of claim 49, wherein the polyvinylpyrrolidone component is provided in an amount greater than 5% to 10% by weight.

53. The contact lens of claim 1, wherein said molded lens body has:
a water loss of less than approximately 5 weight percent after 5 minutes at approximately 75% humidity and approximately 24° C.

54. A contact lens, comprising:
a molded lens body obtained from a contact lens mold assembly including a female lens mold and a male lens mold, the molded lens body comprising a polymerized reaction product of at least one polymerizable monomer and a crosslinker, and taking place in the presence of a preformed polyvinylpyrrolidone polymer having a weight average molecular weight of at least 10,000; and
wherein the polyvinylpyrrolidone polymer is present in the composition in an amount from approximately 1 wt % to 14 wt %.

55. A contact lens, comprising:
a molded lens body obtained from a contact lens mold assembly including a female lens mold and a male lens mold, the molded lens body comprising a polymerized reaction product of at least one polymerizable monomer and a crosslinker, wherein said reaction product is formed in the presence of a preformed polyvinylpyrrolidone polymer having a weight average molecular weight of at least 10,000; and
wherein the polyvinylpyrrolidone polymer is present in the composition in an amount from approximately 1 wt % to 14 wt %.

56. A contact lens, comprising:
a molded lens body obtained from a contact lens mold assembly including a female lens mold and a male lens mold, the molded lens body comprising a polymerized reaction product of at least one polymerizable monomer and a crosslinker and taking place in the presence of a preformed polyvinylpyrrolidone polymer, wherein said polyvinylpyrrolidone polymer interpenetrates said polymerized reaction product and said preformed polyvinylpyrrolidone polymer having a weight average molecular weight of at least 10,000; and
wherein the polyvinylpyrrolidone polymer is present in the composition in an amount from approximately 1 wt % to 14 wt %.

57. The molded contact lens of claim 24, wherein said molded contact lens has a water loss of less than approximately 5 weight percent after 5 minutes at approximately 75% humidity and approximately 24° C.

* * * * *

UNITED STATES PATENT AND TRADEMARK OFFICE
CERTIFICATE OF CORRECTION

PATENT NO.        : 7,279,507 B2                                Page 1 of 1
APPLICATION NO. : 10/937868
DATED             : October 9, 2007
INVENTOR(S)       : Hu et al.

It is certified that error appears in the above-identified patent and that said Letters Patent is hereby corrected as shown below:

Title Page, Item (75) Inventors:

Change "Filene Rossberg, Albuquerque, NM (US)" to -- Eilene Rossberg, Albuquerque, NM (US) --.

Signed and Sealed this

Twenty-sixth Day of February, 2008

JON W. DUDAS
*Director of the United States Patent and Trademark Office*